May 22, 1951 G. J. C. DONK 2,554,096
TRANSCEIVER FOR TELEGRAPHY
Filed July 29, 1948

GERARDUS JOHANNES CHRISTIAAN DONK
INVENTOR
BY Fred M Vogel
AGENT

Patented May 22, 1951 2,554,096

UNITED STATES PATENT OFFICE 2,554,096

TRANSCEIVER FOR TELEGRAPHY

Gerardus Johannes Christiaan Donk, Eindhoven, Netherlands, assignor to Hartford National Bank and Trust Company, Hartford, Conn., as trustee Application July 29, 1948, Serial No. 41,359
In the Netherlands August 12, 1947

8 Claims. (Cl. 178—69)

This invention relates to a transceiver for telegraphy comprising a receiving portion which is used as a monitoring device during transmission.

It is known to utilise a portion of the receiver as a monitoring device by providing feedback coupling through one or more tubes in one or more stages of the receiving portion at the position "transmission" of the transceiver switch, this feedback coupling being such as to form an audio-frequency oscillator. The signals are thus audible in the reproducing device of the receiver by supplying the anode voltage in the rhythm of the signals to the receiving portion concerned.

The object of the invention is to provide a particularly advantageous construction of a transceiver designed for monitoring.

According to the invention, in a transceiver of the aforementioned type the anode voltage is periodically supplied to the receiver portion used as an oscillator by way of an audio-frequency feedback impedance from which is derived the feedback voltage required for the oscillation of the receiver portion concerned.

By providing that the feedback impedance has a direct-current resistance such as to bring about material restriction of the anode current of the receiver, the important advantage is obtained that the load on the source of anode supply is reduced to a minimum by the active portion of the receiver.

A particularly advantageous form of construction is obtained in that the control-grid input circuit of the preferably low frequency receiver portion which is active as an oscillator is coupled, independently of the position of the transceiver switch, to that extremity of the feedback impedance which is remote from the source of anode voltage.

Thus, the important advantage is obtained that, in contradistinction with the known devices, it is not necessary to interrupt the feedback circuit on changing from transmission to reception.

In order that the invention may be more clearly understood and readily carried into effect, it will now be described more fully by reference to the accompanying drawing.

Figure 1:
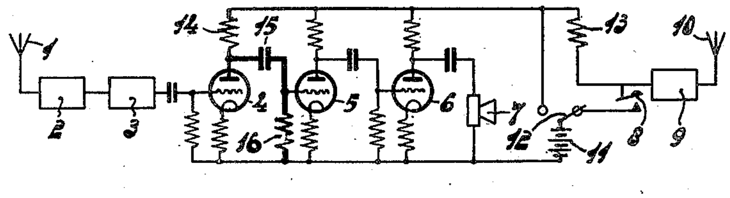

Fig. 1 shows a transceiver according to the invention in which two tubes serve for monitoring purposes.

Figs. 2*a* and 2*b* show analogous monitoring devices, whereas in each of Figs. 3*a* and 3*b* a single tube is utilised as a monitoring oscillator.

Figure 2:
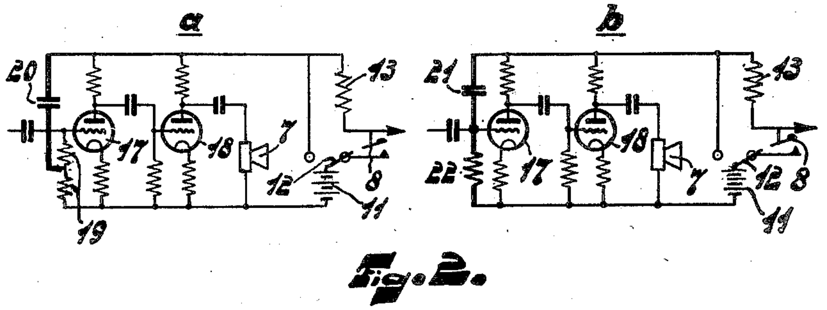
Figure 3:
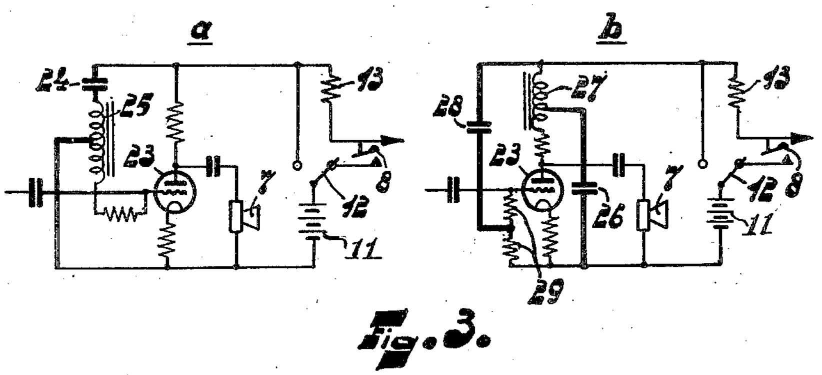

Fig. 1 shows the elements known per se in form of blocks, whereas in Figs. 2 and 3 such elements are omitted for the sake of simplicity. Identical elements are indicated by the same reference numerals.

In the transceiver shown in Fig. 1, reference numeral 1 indicates a receiving aerial which is connected in cascade with a high-frequency and, if desired, intermediate-frequency amplifier 2 and a detector 3. The audible telegraphy signals derived from the detector are supplied, after having been amplified by three low-frequency amplifiers 4, 5, 6 connected in cascade, to a reproducing device 7. If desired, the detector 3 may be constituted by the tube 4.

The transmitting portion comprises a sending key 8, which keys a transmitter 9 in the rhythm of the modulating telegraphy signals. The modulated signals derived from the transmitter 9 are supplied to a transmitting aerial 10.

The transceiver shown comprises an anode voltage source 11 and a transceiver switch 12, by which the required anode voltage is supplied at will to the transmitter or the receiver, thus making either of them operative.

In such a device it is desirable that the signals given by the sending key can be heard with their own receiver. For this purpose the amplifying tubes 5 and 6, which are connected in cascade, are used as an audio-frequency oscillator, the feedback voltage required for the oscillation of the receiver portion concerned being derived from an audio-frequency feedback impedance 13, which connects the anode lead of the receiver to the anode lead of the transmitter and which may be constituted, for example, by a resistance in the construction under consideration. The feedback voltage set up at the feedback impedance 13 is supplied to the control grid of the second amplifying tube 5 across a voltage divider which is constituted by an anode impedance 14 of the first amplifying tube 4, a coupling condenser 15 and a grid resistance 16 of the second amplifying tube 5. If the anode voltage is thus supplied in the rhythm of the signals, through the feedback impedance 13, to the receiver portion which is active as an oscillator (amplifying tubes 5 and 6), the signals transmitted are audible in the reproducing device 7.

By providing that the feedback impedance 13 has a direct-current resistance such as to bring about material restriction of the anode current of the receiver, the load on the anode supply source 11 is reduced to a minimum. In order to set the audio-frequency oscillator into oscillation, it suffices to utilise a comparatively low anode voltage, also because distortions which may be a result of low anode voltage are of minor importance in monitoring.

A suitable choice of the feedback impedance 13 permits of controlling both the strength and the frequency of the tone produced. It is evident that the frequency of the tone produced is also dependent on the frequency characteristic of the amplifier. In the choice of the frequency characteristic allowance has to be made for the frequency which occurs with self-oscillation, in order to obtain an audio-frequency which is suitable for monitoring purposes.

In Fig. 2*a* the receiver portion used as a monitoring device is constituted by two tubes 17 and 18. The feedback voltage required for oscillation is obtained by connecting a tapping point on a grid resistance 19 of tube 17 via a condenser 20 to the feedback impedance 13.

The control grid input circuit of the receiver portion which is active as the oscillator is capacitively coupled, independently of the position of the transceiver switch 12, to that extremity of the feedback impedance 13 which is remote from the anode supply source. Interruption of the feedback circuit in changing from transmission to reception is not required, since the feedback impedance 13 is inactive at the position "reception" of the transceiver switch. Furthermore the feedback circuit 19, 20 required for oscillation does not substantially affect the tubes 17 and 18 which are active as a low-frequency amplifier at the said position of the transceiver switch.

Fig. 2*b* shows a variant of the monitoring device shown in Fig. 2*a*. The feedback voltage of the monitoring device constituted by the tubes 17 and 18, which feedback voltage is required for oscillation, is obtained by connecting the feedback impedance 13 by way of a condenser 21 to the junction of the control-grid of tube 17 and an associated grid resistance 22.

In the device shown in Fig. 2*b*, in contradistinction with Fig. 2*a*, the feedback circuit 21, 22 at the position "reception" of the transceiver switch does affect the tubes 17 and 18 which are active as a low-frequency amplifier, since in this case the resistance 22 and the condenser 21 are connected in parallel with respect to the oscillations to be amplified, via the anode supply source so that the amplification of the low-frequency amplifier is thus reduced. However, by suitable proportioning of the condenser 21 and the resistance 22 it may be ensured that this is not interfering. If desired, a damping resistance may be connected in series with condenser 21.

In Fig. 3*a*, the receiver portion used as a monitoring device is constituted by a single tube 23. In this device it is necessary that the feedback voltage which, for oscillation, is derived from the feedback impedance 13, which may be for example a resistance, should be displaced in phase by approximately 180°. This is ensured by supplying the feedback voltage via 180° phase-shifting network to the control grid of the amplifying tube. In the construction under consideration the phase-shifting network is constituted by an auto transformer 25, of which a tapping point is connected to earth. As an alternative, the phase-shifting network used may be constituted by resistances and condensers.

Fig. 3*b* shows a variant of the monitoring device shown in Fig. 3*a*. In order to obtain the feedback voltage required for oscillation, the alternating output voltage of the tube 23 is displaced in phase by 180° by means of an auto transformer 27, of which a tapping point is connected to earth via a coupling condenser 26. The resulting voltage is supplied across a coupling condenser 28 to a tap provided on a grid resistance 29 so that the feedback voltage is set up at the control grid of tube 23 in a phase suitable for oscillation.

As before, the capacitive coupling of the control grid input circuit of the low-frequency amplifier 23, which is active as an oscillator, is independent of the position of the transceiver switch, similarly as in the circuits described hereinbefore.

In conclusion, it may be mentioned that, in order to obtain a monitoring device of the kind considered, it is not necessary to utilise the low-frequency amplifying portion of the receiver. In most cases a receiver will already start to oscillate in an audio-frequency rhythm merely as a result of the insertion of an impedance, not shunted for audio-frequency voltages, in the common anode lead of the amplifying tubes.

What I claim is:

1. A telegraphy transceiver comprising a carrier wave transmitter provided with a high voltage terminal, a radio receiver provided with a high voltage terminal, said receiver including a detector and a low frequency amplifier coupled to the output of said detector and constituted by at least one stage having an electron discharge amplifying tube provided with a cathode, a grid and an anode, a common high voltage supply for said transmitter and receiver, a switch selectively connecting one end of said supply to the respective high voltage terminals of said receiver and said transmitter, a telegraph key interposed between said switch and the high voltage terminal of said transmitter for interrupting the operation of said transmitter in accordance with signals to be transmitted, an audio frequency feedback impedance connected between the high voltage terminal of said transmitter and the high voltage terminal of said receiver, and circuit means for applying regeneratively the feedback voltage developed across said impedance to the grid of said tube.

2. A telegraphy transceiver comprising a carrier wave transmitter provided with a high voltage terminal, a radio receiver provided with a high voltage terminal, said receiver including a detector and a low frequency amplifier coupled to the output of said detector and constituted by at least one stage having an electron discharge amplifying tube provided with a cathode, a grid and an anode, a common direct-current high voltage supply for said transmitter and receiver, a switch for selectively connecting the positive end of said supply to the respective high voltage terminals of said receiver and said transmitter, a telegraph key interposed between said switch and the high voltage terminal of said transmitter for interrupting the operation of said transmitter in accordance with signals to be transmitted, an audio frequency feedback impedance connected between the high voltage terminal of said transmitter and the high voltage terminal of said receiver and circuit means for applying regeneratively the feedback voltage developed across said impedance to the grid of said tube, said impedance having a direct-current resistance limiting current flow in said receiver to a predetermined value.

3. An arrangement, as set forth in claim 2, wherein the predetermined value of current flow does not exceed fifty percent of the current flow resulting in the condition where said high voltage supply is connected to the high voltage terminal of said receiver.

4. A telepgraphy transceiver comprising a carrier wave transmitter provided with a high voltage terminal, a radio receiver provided with a high voltage terminal and including a detector and a low frequency amplifier coupled to the output of said detector, said amplifier being constituted by three amplifying stages arranged in cascade relation, each stage including an electron discharge tube having a cathode, a grid and an anode, anode impedances connecting the high voltage terminal of said receiver respectively to the anode of each tube, a first capacitor coupling the anode of the tube in the first stage to the grid of the tube in the second stage and a second capacitor coupling the anode of the tube in the second stage to the grid of the tube in the third stage, a common high voltage supply for said transmitter and receiver, a switch for selectively connecting the positive end of said supply to the high voltage terminals of said receiver and said transmitter, a telegraph key interposed between said switch and the high voltage terminal of said transmitter for interrupting the operation thereof in accordance with signals to be transmitted, an audio frequency feedback impedance connected between the high voltage terminals of said transmitter and said receiver, and a regenerative feedback path for supplying the voltage developed across said feedback impedance to the grid of the tube in said second stage, said feedback path being constituted by the anode impedance of the tube in said first stage, said first capacitor and a grid resistance connected between the grid of the tube in the second stage and the negative terminal of said supply.

5. A telegraphy transceiver comprising a carrier wave transmitter provided with a high voltage terminal, a radio receiver provided with a high voltage terminal and including a detector and a low frequency amplifier coupled to the output of said detector, said amplifier being constituted by three amplifying stages arranged in cascade relation, each stage including an electron discharge tube having a cathode, a grid and an anode, anode impedances connecting the high voltage terminal of said receiver respectively to the anode of each tube, a first capacitor coupling the anode of the tube in the first stage to the grid of the tube in the second stage and a second capacitor coupling the anode of the tube in the second stage to the grid of the tube in the third stage, a common direct-current high voltage supply for said transmitter and receiver, a switch for selectively connecting the positive end of said supply to the high voltage terminals of said receiver and said transmitter, a telegraph key interposed between said switch and the high voltage terminal of said transmitter for interrupting the operation thereof in accordance with signals to be transmitted, an audio frequency feedback impedance connected between the high voltage terminals of said transmitter and said receiver, and a regenerative feedback path for supplying the voltage developed across said feedback impedance to the grid of the tube in said second stage, said feedback path being constituted by the anode impedance of the tube in said first stage, said first capacitor and a grid resistance connected between the grid of the tube in the second stage and the negative terminal of said supply, said feedback impedance having a direct-current resistance limiting current flow in said receiver during transmission to a value not exceeding fifty percent of the current flow during reception.

6. A telegraphy transceiver comprising a carrier wave transmitter provided with a high voltage terminal, a radio receiver provided with a high voltage terminal and including a detector and a low frequency amplifier couped to the output of said detector, said amplifier being constituted by two amplifying stages capacitively coupled in cascade relation, each stage including an electron discharge tube having a cathode, a grid and an anode, a common high voltage supply for said transmitter and receiver, a switch for selectively connecting one end of said supply to the high voltage terminals of said receiver and said transmitter, a telegraph key interposed between said switch and the high voltage terminal of said transmitter for interrupting the operation thereof in accordance with signals to be transmitted, an audio frequency feedback impedance connected between the high voltage terminals of said transmitter and said receiver, and a feedback condenser connected between the high voltage terminal of said receiver and the grid of the tube in the first stage for supplying the voltage developed across said feedback impedance thereto.

7. A telegraphy transceiver comprising a carrier wave transmitter provided with a high voltage terminal, a radio receiver including detector and a single stage low frequency amplifier coupled to the output of said detector, said stage including an electron discharge tube having a cathode, a grid and an anode, a common high voltage supply and said transmitter and said receiver, a switch for selectively connecting the positive terminal of said supply to the high voltage terminals of said receiver and said transmitter, a telegraph key interposed between said switch and the high voltage terminal of said transmitter for interrupting the operation thereof in accordance with signals to be transmitted, an audio frequency feedback impedance connected between the high voltage terminals of said transmitter and said receiver, and a phase shifting network coupled between said feedback impedance and the grid of said tube to apply the feedback voltage developed thereacross regeneratively to said grid.

8. An arrangement, as set forth in claim 7, wherein said network imparts a 180 degree phase shift to said feedback voltage applied to said grid.

GERARDUS JOHANNES
CHRISTIAAN DONK.

REFERENCES CITED

The following references are of record in the file of this patent:

UNITED STATES PATENTS

| Number | Name | Date |
|---|---|---|
| 2,400,796 | Watts | May 21, 1946 |
| 2,410,065 | Harrison | Oct. 29, 1946 |
| 2,424,030 | Hayes | July 15, 1947 |
| 2,446,960 | Seebinger | Aug. 10, 1948 |
| 2,492,160 | Lekas | Dec. 27, 1949 |